(12) United States Patent
Ishii et al.

(10) Patent No.: US 6,281,277 B1
(45) Date of Patent: Aug. 28, 2001

(54) HOMOGENEOUSLY SURFACE-FLUORINATED METAL OXIDE PARTICULATES, PROCESS FOR MANUFACTURING THE SAME, AND USE OF THE SAME

(75) Inventors: Nobuaki Ishii; Koichi Wada; Kazuo Sekiguchi, all of Kanagawa; Hiroyuki Takahashi, Tokyo, all of (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/296,667

(22) Filed: Apr. 22, 1999

(30) Foreign Application Priority Data

Apr. 22, 1998 (JP) .................................................. 10-112553

(51) Int. Cl.[7] ...................................................... C08K 3/00
(52) U.S. Cl. ............................ 524/444; 423/69; 423/111; 423/335; 423/610; 423/625; 524/493; 524/497
(58) Field of Search ..................................... 524/493, 497, 524/444; 423/69, 111, 610, 625, 335

*Primary Examiner*—Edward J. Cain
(74) *Attorney, Agent, or Firm*—Sughrue, Mion, Zinn, Macpeak & Seas, PLLC

(57) ABSTRACT

The present invention provides homogeneously surface-fluorinated metal oxide particulates, characterized in that a metal oxide particulate such as Ti, Al, Si, Ag, Cu, Fe, Zr, Ce, Mn, Sn, Ge and Ta is surface reacted with fluorine gas while allowing the metal oxide particulate to flow, and also provides a process for manufacturing the metal oxide particulates.

The homogeneously surface-fluorinated metal oxide particulates according to the present invention are useful as an additive for a weatherproof coating material, a weatherproof resin or a cosmetic material. Furthermore, according to the process of the present invention, the surface of a metal oxide particulate can be homogeneously fluorinated at any ratio in a very simple and efficient manner. Even when the homogeneously surface-fluorinated titanium oxide is incorporated as a white pigment into a thermoplastic resin in a high concentration, the resin coated substrate can maintain the surface smoothness without causing any partial defect and troubles can be greatly prevented from occurring at the melt extrusion coating for obtaining the resin coated substrate.

20 Claims, 1 Drawing Sheet

HOMOGENEOUSLY SURFACE-FLUORINATED METAL OXIDE PARTICULATES, PROCESS FOR MANUFACTURING THE SAME, AND USE OF THE SAME

TECHNICAL FIELD

The present invention relates to homogeneously surface-fluorinated metal oxide particulates and a process for manufacturing the metal oxide particulates. More specifically, the present invention relates to homogeneously surface-fluorinated metal oxide particulates in which the surface is hydrophobitized so that the particle is further improved in the stability, water repellency and dispersibility and prevented from deterioration for a long period of time, and also relates to a manufacturing process and a use thereof.

BACKGROUND ART

Metal oxide particulates are being widely used as a raw material for coating material, matting agent of chemical synthetic fiber, printing ink, cosmetic or milk-white glass, or as a modifier, colorant or pigment for rubber or resin. The surface of a metal oxide particulate is usually covered with a hydroxyl group and assumes to be hydrophilic. Therefore, in the blending of a metal oxide particulate into a resin, a coating material or a cosmetic material which are a hydrophobic material, the metal oxide is surface treated. For example, in the case of titanium oxide, a large number of surface treatments such as surface treatment with a higher fatty acid, surface treatment with an organic silicon compound, a silica-alumina treatment and a surface treatment with various coupling agents, are known and practiced so as to improve dispersibility of the titanium oxide. In the case of aluminum oxide and silicon oxide, attempts are being made to treat the particle surface with a silylating agent or the like.

These methods all are intended to control hydrophobicity or hydrophilicity of the surface or the surface activity by chemically substituting and thereby eliminating the hydroxyl group on the surface of the metal oxide particulate. However, in the case of adding a metal oxide particulate to a fluororesin or a fluorine-based coating material, the metal oxide particulate is preferably more intensified in the hydrophobicity and lipophobicity. For this purpose, the surface must be formed such that fluorine having a surface energy lower than water or oil covers the surface.

In order to solve these problems, for example, JP-A-59-184263 (the term "JP-A" as used herein means an "unexamined published Japanese patent application") discloses a method of adding sodium fluoride to a titanium oxide suspended slurry and stirring the slurry. However, according to this method, when the titanium oxide is a superfine particulate, strong coagulation takes place in the drying step and good dispersibility cannot be obtained even if the coagulate is pulverized. Furthermore, according to this method, the fluorine atom is not bonded directly to the titanium atom, therefore, the titanium oxide surface is not fluorinated in any means.

JP-A-61-215216 discloses a method of using an organic fluorine compound as a hydrophobicity-imparting material in the production of a hydrophobic spherical titanium oxide particulate, however, also in this case, the titanium oxide surface is substantially not fluorinated.

JP-A-3-40919 discloses a method of contacting a fluorocarbon gas with superfine titanium oxide particulate and fluorinating the particle surface at a high temperature of from 200 to 400° C., however, due to the high reaction temperature of 200° C. or more, the thermal efficiency is not necessarily good.

JP-A-6-80901 discloses a pigment (titanium oxide) of which surface is modified with a fluorine gas. According to this method, the pigment can be surface treated at 150° C. or less and dispersibility of the pigment can be improved. However, this surface fluorination method fails in achieving a homogeneous fluorination ratio on the surface of the metal oxide particulate and the dispersibility fluctuates, therefore, in high-level uses, for example, in the case of use as an additive for a water super-repellent coating material or resin, the dispersibility is still in need of improvements.

The object of the present invention is to, by solving the above-described problems encountered in the techniques for producing metal oxide particulates having a substantially fluorinated surface, provide surface-fluorinated metal oxide particulates free of scattering in the physical properties (e.g., dispersibility, water repellency) depending on the particle or particle size at the surface treatment and favored with homogeneously fluorinated surface, and also provide an improved process for manufacturing the metal oxide particulates. More specifically, the object of the present invention is to provide surface-fluorinated metal oxide particulates having higher durability with respect to the physical properties such as water repellency, dispersibility and photostability, and an improved process for manufacturing the metal oxide particulates.

Another object of the present invention is to provide homogeneously surface-fluorinated metal oxide particulates, preferably a homogeneously surface-fluorinated titanium oxide particulate, and an improved thermoplastic resin composition containing the titanium oxide particulate pigment.

SUMMARY OF THE INVENTION

As a result of extensive investigations to solve these problems in conventional techniques, the present inventors have found a manufacturing process comprising reacting a metal oxide particulate with fluorine to fluorinate the surface of the metal oxide particulate, wherein the metal oxide particulate in the flowing state is surface treated. According to this process, the metal oxide particulate can be homogeneously fluorinated while allowing the fluorination reaction to proceed independently of the particle size and preventing the surface from being heterogeneously fluorinated, so that the physical properties of the particle, such as water repellency, dispersibility and photostability, can be more improved and freed from deterioration even in the long-term use. The present invention has been accomplished based on this finding.

Furthermore, it has been verified that among the homogeneously surface-fluorinated metal oxide particulates, titanium oxide particulate is more improved in the light fastness stability, water repellency and dispersibility than conventional titanium oxide particulates having a substantially fluorinated surface, has a high durability of the physical properties, can provide a film free of any partial defects due to contaminating of water adsorbed ascribable to the residual hydrophilic groups, and is suitable for the use particularly in a thermoplastic resin composition for a photographic resin coated paper such as a highly white thin film, which is obtained by incorporating the titanium oxide particulate as a white pigment into a thermoplastic resin.

Based on the above-described knowledge, the present invention provides homogeneously surface-fluorinated metal oxide particulates, a manufacturing process thereof, and a thermoplastic resin composition containing the titanium oxide particulate pigment.

(1) A process for manufacturing homogeneously surface-fluorinated metal oxide particulates, comprising surface reacting a fluorine gas with a metal oxide particulate while allowing the metal oxide particulate to flow.

(2) The process for manufacturing homogeneously surface-fluorinated metal oxide particulates as described in 1 above, wherein a fluorine-containing gas obtained by diluting fluorine is used.

(3) The process for manufacturing homogeneously surface-fluorinated metal oxide particulates as described in 2 above, wherein the diluting gas is a nitrogen or argon gas.

(4) The manufacturing process as described in any one of 1 to 3 above, wherein the reaction time and/or the concentration of the raw material fluorine gas and/or the reaction temperature are controlled to obtain a homogeneously surface-fluorinated metal oxide particulate having a controlled surface fluorination ratio.

(5) The process for manufacturing homogeneously surface-fluorinated metal oxide particulates as described in any one of 1 to 4 above, wherein the metal oxide is titanium oxide.

(6) The process for manufacturing homogeneously surface-fluorinated metal oxide particulates as described in any one of 1 to 4 above, wherein the metal oxide is aluminum oxide.

(7) The process for manufacturing homogeneously surface-fluorinated metal oxide particulates as described in any one of 1 to 4 above, wherein the metal oxide is silicon oxide.

(8) Homogeneously surface-fluorinated metal oxide particulates.

(9) The homogeneously surface-fluorinated metal oxide particulates as described in 8 above, which are obtained by the method described in any one of 1 to 7 above.

(10) The homogeneously surface-fluorinated metal oxide particulates as described in 8 or 9 above, wherein the metal oxide is aluminum oxide.

(11) The homogeneously surface-fluorinated metal oxide particulates as described in 8 or 9 above, wherein the metal oxide is silicon oxide.

(12) The homogeneously surface-fluorinated metal oxide particulates as described in 8 or 9 above, wherein the metal oxide is titanium oxide.

(13) A thermoplastic resin composition containing a homogeneously surface-fluorinated titanium oxide particulate, which is a titanium dioxide-containing thermoplastic resin composition for covering a substrate, wherein the homogeneously surface-fluorinated titanium oxide particulate described in 12 above is used as the titanium dioxide and the water content obtained by dividing the water amount (g) measured by means of a Karl Fischer's moisture meter after 3 g of the composition is allowed to stand in an atmosphere of 60° C. and a relative humidity of 60% for 4 hours to condition the humidity, exposed in a dry air stream having an absolute humidity of 0.009 kgH$_2$O/kg at 80° C. for 4 hours and evacuated at 300° C. for 30 minutes, by the amount (g) of surface-fluorinated titanium dioxide contained in the composition is from 10 to 1,400 ppm.

(14) The thermoplastic resin composition containing surface-fluorinated titanium oxide particulate as described in 13 above, which contains from 20 to 80 wt % of the homogeneously surface-fluorinated titanium oxide particulate.

(15) The thermoplastic resin composition containing homogeneously surface-fluorinated titanium oxide particulate as described in 13 or 14 above, which is obtained by fluorinating titanium dioxide containing from 0.001 to 0.2 parts by weight of aluminum oxide, silicon oxide and/or zirconium oxide per 100 parts by weight of the titanium dioxide to have a fluorine content of from 0.001 to 61 wt % on the surface thereof and then kneading it with a thermoplastic resin.

(16) A masterbatch for a thermoplastic resin composition containing a homogeneously surface-fluorinated titanium oxide particulate, which is a masterbatch for a thermoplastic resin composition containing titanium dioxide in a high concentration for covering a substrate, wherein the homogeneously surface-fluorinated titanium oxide particulate described in 12 above is used as the titanium dioxide and the water content obtained by dividing the water amount (g) measured by means of a Karl Fischer's moisture meter after 3 g of the composition is allowed to stand in an atmosphere of 60° C. and a relative humidity of 60% for 4 hours to condition the humidity, exposed in a dry air stream having an absolute humidity of 0.009 kgH$_2$O/kg at 80° C. for 4 hours and evacuated at 300° C. for 30 minutes, by the amount (g) of surface-fluorinated titanium dioxide the amount (g) of surface-fluorinated titanium dioxide contained in the composition is from 10 to 1,400 ppm.

(17) The masterbatch for a thermoplastic resin composition containing a homogeneously surface-fluorinated titanium oxide particulate as described in 16 above, which contains from 30 to 80 wt % of the homogeneously surface-fluorinated titanium oxide particulate. (18) The masterbatch for a thermoplastic resin composition containing a homogeneously surface-fluorinated titanium oxide particulate as described in 16 or 17 above, which is obtained by fluorinating titanium dioxide containing from 0.001 to 0.2 parts by weight of aluminum oxide, silicon oxide and/or zirconium oxide per 100 parts by weight of the titanium dioxide to have a fluorine content of from 0.001 to 61 wt % on the surface thereof, and kneading and extrusion-molding it with a thermoplastic resin.

BRIEF DESCRIPTION OF THE DRAWING

In FIG. 1, the numeral 1 is an ultraviolet lamp, 2 is a constant temperature bath, 3 is a stirrer, 4 is a differential pressure gauge and 5 is a heat-resisting glass-made reactor.

DETAILED DESCRIPTION OF THE INVENTION

[Fluorination of Metal Oxide Particulate]

Figure 1:
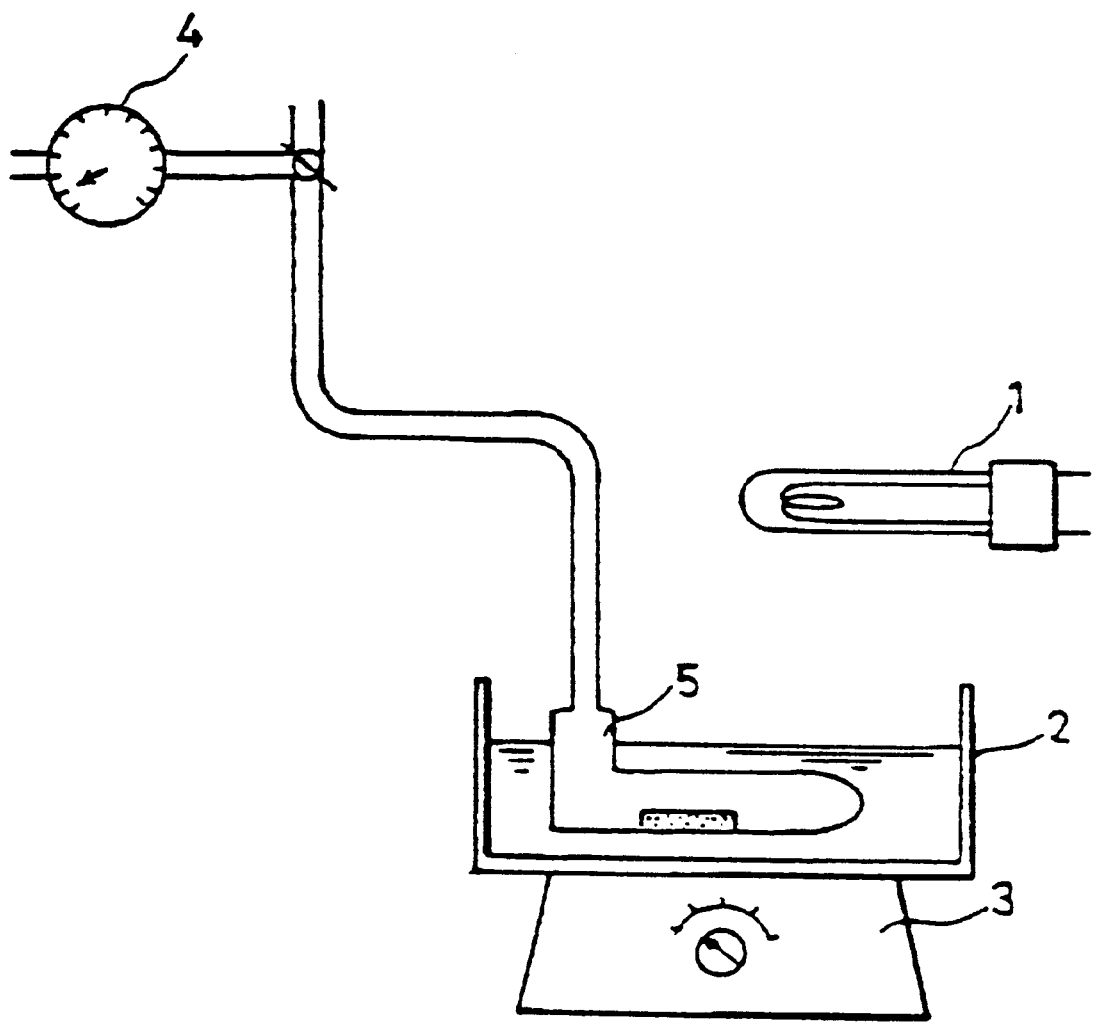
FIG. 1 is a schematic view showing a reaction apparatus used in the experiment for testing the catalysis of the surface-fluorinated titanium oxide particulate of the present invention on the photochemical reaction.

In the present invention, metal oxide particulates having a substantially fluorinated surface obtained by conventional manufacturing methods are simply referred to as "surface-fluorinated metal oxide particulates". On the other hand, metal oxide particulates having a homogeneously fluorinated surface obtained by the manufacturing process of the present invention are referred to as "homogeneously surface-fluorinated metal oxide particulates". The manufacturing process of the present invention is characterized in that a metal oxide particulate in the flowing state is reacted with fluorine to homogeneously fluorinate the particle surface. In the process of the present invention, the fluorination ratio (surface fluorination ratio) can be freely controlled in the production of the above-described homogeneously surface-fluorinated metal oxide particulates.

The term "homogeneously" as used herein means that the surface of a metal oxide particulate is homogeneously fluorinated, however, the metal oxide particulate is not necessarily fluorinated by 100%. In other words, on the surface of the metal oxide particulate, there is no scattering in the fluorination substituent ratio in the depth direction from the surface layer (or distribution of F element present in the depth direction). More specifically, neither a portion where a part of the surface layer is scarcely fluorinated remains nor a portion where the surface layer fails in achieving a desired fluorination ratio, is present among different particles or on the surface of the same particle. Incidentally, in the determination of the fluorination ratio on the particle surface, F element and elements other than F element present in the area from the particle surface to the depth of about 100 Å are measured by XPS (X-ray photoelectron spectroscopy) and from the analysis results obtained, the ratio of fluorination by substitution at the surface treatment is determined. For example, in the case of fluorination of titanium oxide, assuming that all Ti (namely 100%) on the surface is converted into $TiF_4$, the fluorine content on the particle surface is $(4F/TiF_4) \times 100 = 61.3$ wt %.

The metal oxide used as the raw material in the present invention means an oxide of a metal. Specific examples thereof include oxides of titanium, aluminum, silicon, silver, copper, iron, cerium, zirconium, zinc, tin, germanium and tantalum. Among these, oxides of titanium, aluminum and silicon are preferred.

The particle size, specific surface area, crystal form and the like of the metal oxide particulate used as the raw material are not particularly limited and various sizes, surface areas or forms may be used. The particle size is usually, in terms of the average primary particle size, 1,000 μm or less, preferably 100 μm or less, more preferably from 0.005 to 1 μm. The specific surface area (by BET method) is usually 0.01 m²/g or more, preferably from 3 to 300 m²/g. The crystal form may be, for example, in the case of titanium oxide, any of amorphous, anatase, brookite and rutile; in the case of aluminum oxide, any of amorphous, α-alumina and γ-alumina; and in the case of silicon oxide, either silicic acid anhydride or synthetic silicic acid.

The fluorination reaction of the metal oxide particulates is performed by contacting a metal oxide particulate with a gaseous phase fluorine while allowing the particulate to flow. The fluorination treatment is, for example, performed as follows. The raw material metal oxide particulate is charged or filled in a reactor capable of allowing the particles to flow and heated to a predetermined temperature while allowing the metal oxide particulate to flow within the reactor. Into this reactor, a fluorine gas or a fluorine-containing gas was blown or filled and reacted for a predetermined time.

At this time, the reactor is not particularly limited as far as the reactor can be heated, the metal oxide particulate can be housed and allowed to flow within the reactor, and a fluorine gas or a fluorine-containing gas can be held or traveled therein. The means for traveling the metal oxide particulate is also not particularly limited and for example, the reactor may be rotated or vibrated, the stirrer provided within the reactor may be rotated, or a gas may be blown to travel the particles. It is also possible to allow the metal oxide particulate to freely fall within the reactor having filled therein a fluorine gas or a fluorine-containing gas. Examples of the reactor which can be used in the present invention include a tumbler drier, an agitating drier, a rotary drier, a fluidized-bed drier, a vibrating drier, a vibrating fluidized-bed drier, a rotary kiln and a powder falling-type reactor. Among these, a tumbler drier is preferred.

The reactor heating temperature, namely, the reaction temperature is usually from 0 to 200° C., preferably from 20 to 190° C.

The feeding of fluorine gas is not particularly limited and either a continuous flow system or a batch system may be used. In the case of the continuous flow system, the flow rate of fluorine gas is usually from 0.1 to 100 ml/g(raw material)·min, preferably from 0.5 to 50 ml/g(raw material)·min. In the case of batch system, the fluorine gas flow rate is not particularly limited, however, it is usually from 0.1 to 200 ml/g(raw material)·min, preferably from 1 to 50 ml/g(raw material)·min. In the case of the batch system, a method of repeating the fluorination reaction by displacing only the fluorine component or a method of successively replenishing the fluorine gas in the portion consumed for the reaction may also be used.

The fluorine gas concentration is suitably 100%, however, a fluorine-containing gas obtained by the dilution with nitrogen, argon or the like may also be used. The fluorine concentration of the fluorine-containing gas is 0.01 vol % or more, preferably 0.1 vol % or more, more preferably 1 vol % or more.

The reaction time is not particularly limited but is preferably from moment to 50 hours or from moment to 24 hours. Needless to say, the fluorination ratio on the surface of the metal oxide particulate can be uniformly increased by prolonging the reaction time under the conditions that fluorine is present in a sufficiently large amount. The reaction in usual is preferably performed at an atmospheric pressure but may also be performed under pressurization and the reaction pressure is not particularly limited.

Usually, by controlling the conditions in the combination of fluorine gas concentration, reaction time and reaction temperature, the fluorination ratio of the particle surface can be easily controlled.

As described in the foregoing, the homogeneously surface-fluorinated metal oxide particulates obtained by the manufacturing process of the present invention can maintain the particle size and high specific surface area of the raw material. The metal oxide particulate has an average primary particle size of 1,000 μm or less, preferably 100 μm or less. A particle or superfine particle having an average primary particle size of from 0.005 to 1 μm is more preferred. The specific surface area is very large and the specific surface area by the BET method is 0.01 m²/g or more, preferably from 3 to 300 m²/g.

The homogeneously surface-fluorinated metal oxide particulates of the present invention exhibit water repellency and oil repellency effects, excellent resistance against acid and alkali, and very high dispersibility. When the homogeneously surface-fluorinated metal oxide particulate of the present invention is added to a fluorine-type coating material or fluororesin for the purpose of improving light fastness, weatherability, covering power or whiteness, controlling the refractive index or absorbing ultraviolet rays, the particles are uniformly dispersed and thereby a very smooth coating is advantageously formed. Furthermore, because of absence of particles partly or entirely having a low fluorination ratio, in other words, still assuming hydrophilicity, the physical properties such as water repellency, light fastness and dispersibility are difficult to change by aging, as a result, the coating material film or resin film obtained can be practicable and free of partial defects.

Therefore, the homogeneously surface-fluorinated metal oxide particulates of the present invention are very useful as an additive for a water repellent/weatherproof coating material, a water repellent/weatherproof resin or a cosmetic material. Furthermore, according to the process of the present invention, homogeneous fluorination on the surface of the metal oxide particulate can be very easily and efficiently attained and the fluorination ratio can be freely controlled. Thus, the present invention is very useful in industry.

[Thermoplastic Resin Composition Containing Homogeneously Surface-Fluorinated Titanium Oxide Pigment]

Among homogeneously surface-fluorinated metal oxide particulates of the present invention, the homogeneously surface-fluorinated titanium oxide pigment is suitable for a photographic thermoplastic resin composition used for a photographic resin coated paper such as highly white thin film. A thermoplastic resin composition containing the homogeneously surface-fluorinated titanium oxide pigment is described below.

Titanium oxide (also called titanium dioxide) is widely used as a white pigment or the like of a photographic thermoplastic resin composition for a photographic resin coated paper such as highly white thin film. The titanium dioxide blended for this purpose is usually subjected to a surface treatment using aluminum oxide, silicon oxide, titanium oxide, zirconium oxide, magnesium oxide or a hydrate thereof so as to control the optical activity or improve the weatherability or dispersibility as a pigment. Among these, a surface treatment using an aluminum oxide hydride for controlling the optical activity is most commonly performed and various methods have been proposed therefor.

For example, U.S. Pat. No. 4,416,699 proposes a method comprising a procedure of (1) adding a predetermined amount of titanium dioxide to water to form a slurry, (2) adjusting the slurry temperature to fall within a predetermined range, (3) adding and dissolving a soluble aluminum compound in the slurry and (4) ripening the slurry at a predetermined temperature and a predetermined pH for a predetermined time period.

JP-A-55-154317 proposes a method comprising a procedure of dispersing titanic acid or titanium dioxide in water to have a concentration of from 100 to 500 g/l, preferably from 250 to 400 g/l, thereby forming a slurry, then adding thereto sodium aluminate and, if desired, a dispersant, thoroughly dispersing the titanic acid or titanium dioxide, neutralizing it with an acid and precipitating the hydrated oxide of aluminum.

The amount treated by such an inorganic oxide or a hydrate thereof is generally from 0.1 to 5 parts by weight per 100 parts by weight of titanium dioxide.

In general, for coating one surface or both surfaces of a substrate such as paper and polyester with a thermoplastic resin composition containing the titanium dioxide pigment, a melt extrusion lamination technique is used.

The thus-manufactured resin coated paper is recently required to have more excellent whiteness and high opacity, however, due to failure in dispersion of titanium oxide, the coating state is disadvantageously poor.

The poor coating state means that the film has inferior surface smoothness or bubbles are mixed into the film. This poor coating state incurs problems such that the formation by lamination must be interrupted or high-speed and stable formation cannot be achieved.

According to the studies by the present inventors, it is known that excellent dispersibility is exhibited and reduction of MFR hardly occurs when the surface-fluorinated titanium oxide particulate is blended in a thermoplastic resin so that, for example, (1) when a resin having incorporated thereinto titanium dioxide mainly for the purpose of imparting high opacity or whiteness is coated on paper or other support to form a thin film, a good surface state extremely reduced in microgrit (a relatively hard and small projecting abnormality appearing on the film surface), gel (a relatively soft and small rising abnormality) or the like can be obtained even if the titanium dioxide filler concentration is increased, (2) at the working of melt extrusion coating for obtaining such a resin coated paper or a resin coated support, generation of troubles can be greatly prevented, or (3) reduction in the melt flow rate (MFR) due to the addition of titanium dioxide can be suppressed to thereby improve flowability. Furthermore, the present inventors have a knowledge about a surface-fluorinated titanium oxide particulate-containing thermoplastic resin composition where the water content in the thermoplastic resin is controlled to reach a specific level (10 to 1,400 ppm), and also about a masterbatch therefor (see, Comparative Examples, Comparative Use Examples).

However, the above-described surface-fluorinated titanium oxide particulate is not always homogeneously fluorinated in the depth direction, therefore, for example, the surface may not be entirely or partly fluorinated or may not have a desired fluorination ratio in some cases. In other words, some particles inevitably still assume hydrophilicity on the surface thereof. Incidentally, when particles having a low fluorination ratio and still assuming hydrophilicity are present, the physical properties such as water repellency, light fastness and dispersibility are readily deteriorated by aging and the film formed cannot have durability in the physical properties. Furthermore, since the dispersibility is reduced, the particles are not uniformly blended in a resin or a coating material, as a result, the coating material film or resin film formed is liable to have partial defects and cannot be freed from problems such as occurrence of troubles in the film formation due to mixing of the water adsorbed.

The homogeneously surface-fluorinated metal oxide particulates of the present invention are extremely reduced in the number of particles in which the entire surface or a part of the surface has a low fluorination ratio and still assumes hydrophilicity, therefore, water is scarcely adsorbed, the water repellency and oil repellency are high, the acid resistance and alkali resistance are excellent, and particularly the dispersibility is outstandingly good. By virtue of these properties, when the metal oxide particulate is added and blended with a coating material or resin, the particles can be uniformly dispersed and a very smooth film greatly reduced in partial defects can be formed. Furthermore, because of absence of portions still assuming hydrophilicity, the physical properties such as water repellency, light fastness and dispersibility are difficult to change and the coating material film or resin film obtained can have high durability with respect to the physical properties.

The raw material of titanium dioxide for use in the thermoplastic resin composition of the present invention (namely, homogeneously surface-fluorinated titanium oxide particulate) may be any of amorphous, anatase, brookite and rutile as described above, and also may be produced by any of chlorine method, sulfuric acid method, gaseous phase method and liquid phase method.

For homogeneously fluorinating the surface of titanium oxide, the process described above is used. The homogeneously surface-fluorinated titanium oxide particulate for use in the thermoplastic resin composition of the present invention preferably has a fluorine content (by XPS quantitation) of from 0.001 to 61 wt %, more preferably from 0.1 to 61 wt %.

The particle size of the titanium dioxide is preferably, in terms of the average particle size, from 0.02 to 1.0 μm for the purpose of improving optical properties of the thermoplastic resin composition. If the average particle size is larger or smaller than this range, the optical properties such as light scattering ability or hue are greatly deteriorated.

On the surface of this titanium dioxide, fluorine atom is homogeneously and chemically bonded, therefore, the light fastness stability, water repellency and dispersibility are excellent and these properties scarcely deteriorate by aging. Furthermore, particles with the entire surface or a part of the surface having a low fluorination ratio and still assuming hydrophilicity are greatly reduced, therefore, water is little adsorbed.

In the present invention, for improving dispersibility of the titanium oxide at the manufacturing of a masterbatch, titanium dioxide containing one or more other metal oxides such as aluminum oxide, silicon oxide and zirconium oxide in an amount of from 0.001 to 0.2 parts by weight per 100 parts by weight of titanium dioxide may be fluorination treated.

Also in this case, the surface fluorination ratio (by XPS quantitation) is from 0.001 to 61 wt %, preferably from 0.1 to 61 wt %, of the surface of titanium dioxide containing the oxide.

The thus-manufactured homogeneously surface-fluorinated titanium dioxide is kneaded with a thermoplastic resin. The kneader is not particularly limited and a batch kneader such as banbury mixer, a twin screw kneader, a single screw extruder having a kneading function or the like may be used.

Examples of the thermoplastic resin for use in the resin composition of the present invention include polyolefin such as polyethylene, polypropylene, ethylenepropylene polymer (including random or block copolymer) and polystyrene, ABS resin, AS resin, polyvinyl chloride, polyester, polyacetal, polycarbonate, aromatic polyethers, aromatic polyesters, polyamides, polysulfones, a copolymer containing at least one of these polymers as a repeating structural unit, and fluororesin such as tetra-fluoroethylene-hexafluoropropylene copolymer, tetra-fluoroethylene-perfluoroalkylvinyl ether copolymer, polychlorotrifluoroethylene, ethylene-tetrafluoroethylene copolymer and polyvinylidene fluoride. Among these, polyolefin is preferred.

In the present invention, such a thermoplastic resin may be kneaded with the homogeneously surface-fluorinated titanium oxide to manufacture a thermoplastic resin composition containing homogeneously surface-fluorinated titanium dioxide pigment or a masterbatch containing a homogeneously surface-fluorinated titanium oxide particulate pigment in a high concentration, of the present invention.

In the present invention, before the homogeneously surface-fluorinated titanium dioxide particulate is kneaded with a thermoplastic resin or at the same time with the kneading, a metal soap such as zinc stearate or antioxidant may be added so as to increase the lubricity or dispersibility. The amount of the metal soap added is preferably from 0.1 to 10 parts by weight per 100 parts by weight of titanium dioxide, and the amount of the antioxidant added is preferably from 0.001 to 0.1 parts by weight per 100 parts by weight of thermoplastic resin.

In general, the homogeneously surface-fluorinated titanium dioxide pigment is kneaded with a resin at a high concentration and previously worked into pellets, thereby manufacturing a masterbatch. Thereafter, on forming a film or the like, the masterbatch and an uncolored (containing no pigment) resin are blended and used as a resin composition.

In the case of a masterbatch, the homogeneously surface-fluorinated titanium dioxide pigment is contained in an amount of from 30 to 80 wt % per 100 parts by weight of the raw material resin. On the other hand, in the case of a resin composition, the homogeneously surface-fluorinated titanium dioxide pigment is contained in an amount of from 20 to 80 wt % based on the raw material resin.

In the case of a masterbatch, if the pigment concentration is less than 30 wt %, the resin composition formed has a low pigment concentration and sufficiently high optical properties such as opacity and whiteness can be hardly obtained, whereas if it exceeds 80 wt %, uniform dispersion of the pigment becomes difficult to attain in the process of manufacturing a masterbatch. In the case of a resin composition, if the pigment concentration is less than 20 wt %, sufficiently high optical properties can be difficultly obtained, whereas if it exceeds 80 wt %, film defects such as bubbling ascribable to volatile matters such as water carried over from the pigment at the formation of a highly white thin film are disadvantageously liable to occur.

By the above-described manufacturing process, a thermoplastic resin composition and masterbatch further reduced in the water content of the present invention can be obtained.

The raw material resin produced by an ordinary method has a sufficiently low water content of about 50 ppm or less, however, due to contaminating of water during the process of adding and blending a hygroscopic metal oxide particulate, film defects are generated in conventional techniques. According to the present invention, the water content is reduced in the reaction process of homogeneously fluorinating the surface of titanium oxide or titanium oxide containing aluminum oxide, silicon oxide, zirconium oxide or the like while stably maintaining the water repellency. Therefore, water is prevented from intermixing with the resin composition in the process of blending the homogeneously surface-fluorinated titanium oxide particulate into a resin and a composition having a water content controlled to a low level and containing a homogeneously surface-fluorinated metal oxide particulate can be more easily obtained.

In other words, by using a titanium oxide particulate or a titanium oxide particulate containing another metal oxide, of which surface is uniformly fluorinated by a gaseous phase method, a resin composition or masterbatch having a water content defined below of from 10 to 1,400 ppm of the present invention can be more easily manufactured.

The "water content" as used herein means a value obtained by dividing the water amount (g) measured by means of a Karl Fischer's moisture meter after 3 g of the composition is allowed to stand in an atmosphere of 60° C. and a relative humidity of 60% for 4 hours to condition the humidity, exposed in a dry air stream having an absolute humidity of 0.009 kgH$_2$O/kg at 80° C. for 4 hours and evacuated at 300° C. for 30 minutes, by the amount (g) of surface-fluorinated titanium dioxide contained in the resin composition or masterbatch.

If the water content defined above exceeds 1,400 ppm in the resin composition or masterbatch, various defects appearing on the film surface increase at the film formation by a melt lamination method and cause problems in practice, whereas if it is less than 10 ppm, the titanium dioxide pigment has a problem in the stability and the film formed suffers from inferior optical properties and smoothness. The water content is preferably from 10 to 1,000 ppm.

In the present invention, the water content is controlled to a specific range of sufficiently low level and furthermore, a homogeneously surface-fluorinated titanium oxide particulate having excellent dispersibility in a thermoplastic resin and scarcely undergoing reduction of MFR, thus improved in the fluidity, is used as the titanium dioxide. Therefore, even if a thin film is formed by increasing the content of the titanium oxide particulate, the resin coated paper or the like obtained can have good thin film state with excellent film surface smoothness and high fluidity.

BEST MODE FOR CARRYING OUT THE INVENTION

The homogeneously surface-fluorinated metal oxide particulates and the manufacturing process thereof of the present invention are described in greater detail below particularly by referring to titanium oxide, aluminum oxide and silicon oxide as examples. Furthermore, the composition obtained by incorporating the surface fluorinated titanium oxide particulate pigment into a thermoplastic resin is also described by referring to use examples. However, the present invention should not be construed as being limited to the following examples by any means.

In the following examples, the specific surface area of metal oxide particulates is determined by the BET method. The fluorine content on the particle surface is the ratio (wt %) of fluorine in all constituent elements on the sample surface measured by XPS and shown merely by %, in which, however, the carbon by contamination is not included.

EXAMPLE 1
Fluorination of Titanium Dioxide Particulate 320 g of titanium dioxide particulate (average primary particle size: 0.022 $\mu$m, specific surface area: 55 $m^2/g$) was filled in a 40 L-volume tumbler drier and pre-treated by calcination at 180° C. under reduced pressure for 1 hour. After cooling the system to room temperature, a gas (fluorine gas content: 10 vol %) obtained by diluting fluorine gas with nitrogen gas was filled under atmospheric pressure and while rotating the drier at 26 rpm, the surface fluorination treatment was performed for 0.5 hours. The fluorinated titanium dioxide particulate had a specific surface area of 55 $m^2/g$, thus maintained the high specific surface area. The fluorine content on the surface of titanium dioxide particulate was quantitated by XPS, as a result, the fluorine content of 10 samples selected at random was from 2.9 to 3.1% (average: 3.0%), revealing that the surface was homogeneously fluorinated. The results obtained are shown in Table 1.

EXAMPLE 2
Fluorination of Titanium Dioxide Particulate 320 g of titanium dioxide particulate (average primary particle size: 0.022 $\mu$m, specific surface area: 55 $m^2/g$) was filled in a 40 L-volume tumbler drier and pre-treated by calcination at 180° C. under reduced pressure for 1 hour. After cooling the system to 100° C., a gas (fluorine gas content: 10 vol %) obtained by diluting fluorine gas with nitrogen gas was filled under atmospheric pressure and while rotating the drier at 26 rpm, the surface fluorination treatment was performed for 0.5 hours. The fluorinated titanium dioxide particulate had a specific surface area of 53 $m^2/g$, thus maintained the high specific surface area. The fluorine content on the surface of titanium dioxide particulate was quantitated by XPS, as a result, the fluorine content of 10 samples selected at random was from 3.4 to 3.6% (average: 3.5%), revealing that the surface was homogeneously fluorinated. The results obtained are shown in Table 1.

EXAMPLE 3
Fluorination of Titanium Dioxide Particulate 320 g of titanium dioxide particulate (average primary particle size: 0.022 $\mu$m, specific surface area: 55 $m^2/g$) was filled in a 40 L-volume tumbler drier and pre-treated by calcination at 180° C. under reduced pressure for 1 hour. After cooling the system to 150° C., a gas (fluorine gas content: 10 vol %) obtained by diluting fluorine gas with nitrogen gas was filled under atmospheric pressure and while rotating the drier at 26 rpm, the surface fluorination treatment was performed for 0.5 hours. The fluorinated titanium dioxide particulate had a specific surface area of 54 $m^2/g$, thus maintained the high specific surface area. The fluorine content on the surface of titanium dioxide particulate was quantitated by XPS, as a result, the fluorine content of 10 samples selected at random was from 3.8 to 4.0% (average: 3.9%), revealing that the surface was homogeneously fluorinated. The results obtained are shown in Table 1.

EXAMPLE 4
Fluorination of Titanium Dioxide Particulate 320 g of titanium dioxide particulate (average primary particle size: 0.022 $\mu$m, specific surface area: 55 $m^2/g$) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 1.5 hours. The fluorinated titanium dioxide particulate had a specific surface area of 52 $m^2/g$, thus maintained the high specific surface area. The fluorine content on the surface of titanium dioxide particulate was quantitated by XPS, as a result, the fluorine content of 10 samples selected at random was from 4.6 to 4.9% (average: 4.8%), revealing that the surface was homogeneously fluorinated. The results obtained are shown in Table 1.

EXAMPLE 5
Fluorination of Titanium Dioxide Particulate 107 g of titanium dioxide particulate (average primary particle size: 0.022 $\mu$m, specific surface area: 55 $m^2/g$) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 4.5 hours. The fluorinated titanium dioxide particulate had a specific surface area of 53 $m^2/g$, thus maintained the high specific surface area. The fluorine content on the surface of titanium dioxide particulate was quantitated by XPS, as a result, the fluorine content of 10 samples selected at random was from 11.5 to 11.9% (average: 11.7%), revealing that the surface was homogeneously fluorinated. The results obtained are shown in Table 1.

EXAMPLE 6
Fluorination of Titanium Dioxide Particulate 64 g of titanium dioxide particulate (average primary particle size: 0.022 $\mu$m, specific surface area: 55 $m^2/g$) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 7.5 hours. The fluorinated titanium dioxide particulate had a specific surface area of 53 m$^2$g, thus maintained the high specific surface area. The fluorine content on the surface of titanium dioxide particulate was quantitated by XPS, as a result, the fluorine content of 10 samples selected at random was from 19.6 to 19.9% (average: 19.8%), revealing that the surface was homogeneously fluorinated. The results obtained are shown in Table 1.

EXAMPLE 7
Fluorination of Titanium Dioxide Particulate 320 g of titanium dioxide particulate (average primary particle size: 0.210 μm specific surface area: 8 m$^2$/g) was filled in a 40 L-volume tumbler drier and pre-treated by calcination at 180° C. under reduced pressure for 1 hour. After cooling the system to 150° C., a gas (fluorine gas content: 10 vol %) obtained by diluting fluorine gas with nitrogen gas was filled under atmospheric pressure and while rotating the drier at 26 rpm, the surface fluorination treatment was performed for 1.5 hours. After the reaction, the pressure was reduced to remove the gas. Thereafter, the fluorine-containing gas was newly filled and fluorination treatment was performed under the above-described conditions. This operation was repeated to perform the fluorination treatment 3 times in total. The fluorinated titanium dioxide particulate had a specific surface area of 7.6 m$^2$/g, thus maintained the high specific surface area. The fluorine content on the surface of titanium dioxide particulate was quantitated by XPS, as a result, the fluorine content of 10 samples selected at random was from 11.3 to 11.7% (average: 11.5%), revealing that the surface was homogeneously fluorinated. The results obtained are shown in Table 1.

EXAMPLE 8
Fluorination of Titanium Dioxide Particulate 320 g of titanium dioxide particulate (average primary particle size: 0.210 μm, specific surface area: 8 m$^2$/g) was filled in a 40 L-volume tumbler drier and pre-treated by calcination at 180° C. under reduced pressure for 1 hour. After cooling the system to 150° C., a gas (fluorine gas content: 10 vol %) obtained by diluting fluorine gas with nitrogen gas was filled under atmospheric pressure and while rotating the drier at 26 rpm, the surface fluorination treatment was performed for 1.5 hours. After the reaction, the pressure was reduced to remove the gas. Thereafter, the fluorine-containing gas was newly filled and fluorination treatment was performed under the above-described conditions. This operation was repeated to perform the fluorination treatment 5 times in total. The fluorinated titanium dioxide particulate had a specific surface area of 7.6 m$^2$/g, thus maintained the high specific surface area. The fluorine content on the surface of titanium dioxide particulate was quantitated by XPS, as a result, the fluorine content of 10 samples selected at random was from 19.3 to 19.7% (average: 19.5%), revealing that the surface was homogeneously fluorinated. The results obtained are shown in Table 1.

EXAMPLE 9
Fluorination of Titanium Dioxide Particulate 320 g of titanium dioxide particulate (average primary particle size: 0.210 μm, specific surface area: 8 m$^2$/g) was filled in a 40 L-volume tumbler drier and pre-treated by calcination at 180° C. under reduced pressure for 1 hour. After cooling the system to 150° C., a gas (fluorine gas content: 20 vol %) obtained by diluting fluorine gas with nitrogen gas was blown to flow under atmospheric pressure and thereby the surface fluorination treatment was performed for 0.5 hours. The fluorinated titanium dioxide particulate had a specific surface area of 7.8 m$^2$/g, thus maintained the high specific surface area. The fluorine content on the surface of titanium dioxide particulate was quantitated by XPS, as a result, the fluorine content of 10 samples selected at random was from 9.0 to 9.2% (average: 9.1%), revealing that the surface was homogeneously fluorinated. The results obtained are shown in Table 1.

EXAMPLE 10
Fluorination of Aluminum Oxide Particulate 320 g of aluminum oxide particulate (average primary particle size: 0.02 μm, specific surface area: 100 m$^2$/g) was filled in a 40 L-volume tumbler drier and pre-treated by calcination at 180° C. under reduced pressure for 1 hour. After cooling the system to room temperature, a gas (fluorine gas content: 10 vol %) obtained by diluting fluorine gas with nitrogen gas was filled under atmospheric pressure and while rotating the drier at 26 rpm, the surface fluorination treatment was performed for 0.5 hours. The fluorinated aluminum oxide particulate had a specific surface area of 98 m$^2$/g, thus maintained the high specific surface area. The fluorine content on the surface of aluminum oxide particulate was quantitated by XPS, as a result, the fluorine content of 10 samples selected at random was from 6.9 to 7.3% (average: 7.1%), revealing that the surface was homogeneously fluorinated. The results obtained are shown in Table 1.

EXAMPLE 11
Fluorination of Aluminum Oxide Particulate 320 g of aluminum oxide particulate (average primary particle size: 0.02 μm, specific surface area: 100 m$^2$/g) was filled in a 40 L-volume tumbler drier and pre-treated by calcination at 180° C. under reduced pressure for 1 hour. After cooling the system to 100° C., a gas (fluorine gas content: 10 vol %) obtained by diluting fluorine gas with nitrogen gas was filled under atmospheric pressure and while rotating the drier at 26 rpm, the surface fluorination treatment was performed for 0.5 hours. The fluorinated aluminum oxide particulate had a specific surface area of 98 m$^2$/g, thus maintained the high specific surface area. The fluorine content on the surface of aluminum oxide particulate was quantitated by XPS, as a result, the fluorine content of 10 samples selected at random was from 8.5 to 8.9% (average: 8.7%), revealing that the surface was homogeneously fluorinated. The results obtained are shown in Table 1.

EXAMPLE 12
Fluorination of Aluminum Oxide Particulate 320 g of aluminum oxide particulate (average primary particle size: 0.02 μm, specific surface area: 100 m$^2$/g) was filled in a 40 L-volume tumbler drier and pre-treated by calcination at 180° C. under reduced pressure for 1 hour. After cooling the system to 150° C., a gas (fluorine gas content: 10 vol %) obtained by diluting fluorine gas with nitrogen gas was filled under atmospheric pressure and while rotating the drier at 26 rpm, the surface fluorination treatment was performed for 0.5 hours. The fluorinated aluminum oxide particulate had a specific surface area of 96 m$^2$/g, thus maintained the high specific surface area. The fluorine content on the surface of aluminum oxide particulate was quantitated by XPS, as a result, the fluorine content of 10 samples selected at random was from 10.5 to 10.9% (average: 10.7%), revealing that the surface was homogeneously fluorinated. The results obtained are shown in Table 1.

EXAMPLE 13
Fluorination of Aluminum Oxide Particulate

A gas (fluorine gas content: 20 vol %) obtained by diluting fluorine gas with nitrogen gas was filled under atmospheric pressure into a 20 L-volume powder dropping-type reactor and from the top of the reactor, 10 g of aluminum oxide particulate (average primary particle size: 0.02 μm, specific surface area: 100 m$^2$/g) was freely fallen at room temperature and thereafter left standing for 0.5 hours, thereby performing the surface fluorination treatment. The fluorinated aluminum oxide particulate had a specific surface area of 95 m$^2$/g, thus maintained the high specific surface area. The fluorine content on the surface of aluminum oxide particulate was quantitated by XPS, as a result, the fluorine content of 10 samples selected at random was from 5.9 to 6.9% (average: 6.4%), revealing that the surface was homogeneously fluorinated. The results obtained are shown in Table 1.

EXAMPLE 14
Fluorination of Silicon Dioxide Particulate 320 g of silicon dioxide particulate (average primary particle size: 0.020 μm, specific surface area: 120 m$^2$/g) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 5 hours. The fluorinated silicon dioxide particulate had a specific surface area of 116 m$^2$/g, thus maintained the high specific surface area. The fluorine content on the surface of silicon dioxide particulate was quantitated by XPS, as a result, the fluorine content of 10 samples selected at random was from 2.4 to 2.7% (average: 2.5%), revealing that the surface was homogeneously fluorinated. The results obtained are shown in Table 1.

EXAMPLE 15
Fluorination of Silicon Dioxide Particulate 107 g of silicon dioxide particulate (average primary particle size: 0.020 μm, specific surface area: 120 m$^2$/g) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 15 hours. The fluorinated silicon dioxide particulate had a specific surface area of 117 m$^2$/g, thus maintained the high specific surface area. The fluorine content on the surface of silicon dioxide particulate was quantitated by XPS, as a result, the fluorine content of 10 samples selected at random was from 3.8 to 4.0% (average: 3.9%), revealing that the surface was homogeneously fluorinated. The results obtained are shown in Table 1.

EXAMPLE 16
Fluorination of Silicon Dioxide Particulate 64 g of silicon dioxide particulate (average primary particle size: 0.022 μm, specific surface area: 120 m$^2$/g) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 25 hours. The fluorinated silicon dioxide particulate had a specific surface area of 118 m$^2$/g, thus maintained the high specific surface area. The fluorine content on the surface of silicon dioxide particulate was quantitated by XPS, as a result, the fluorine content of 10 samples selected at random was from 4.8 to 5.4% (average: 5.1%), revealing that the surface was homogeneously fluorinated. The results obtained are shown in Table 1.

EXAMPLE 17
Fluorination of Silicon Dioxide Particulate 320 g of silicon dioxide particulate (average primary particle size: 0.020 μm, specific surface area: 120 m$^2$/g) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 5 hours. After the reaction, the pressure was reduced to remove the gas. Thereafter, the fluorine-containing gas was newly filled and fluorination treatment was performed under the above-described conditions. This operation was repeated to perform the fluorination treatment 3 times in total. The fluorinated silicon dioxide particulate had a specific surface area of 115 m$^2$/g, thus maintained the high specific surface area. The fluorine content on the surface of silicon dioxide particulate was quantitated by XPS, as a result, the fluorine content of 10 samples selected at random was from 3.8 to 4.4% (average: 4.1%), revealing that the surface was homogeneously fluorinated. The results obtained are shown in Table 1.

EXAMPLE 18
Fluorination of Silicon Dioxide Particulate 320 g of silicon dioxide particulate (average primary particle size: 0.020 μm, specific surface area: 120 m$^2$/g) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 5 hours. After the reaction, the pressure was reduced to remove the gas. Thereafter, the fluorine-containing gas was newly filled and fluorination treatment was performed under the above-described conditions. This operation was repeated to perform the fluorination treatment 5 times in total. The fluorinated silicon dioxide particulate had a specific surface area of 113 m$^2$/g, thus maintained the high specific surface area. The fluorine content on the surface of silicon dioxide particulate was quantitated by XPS, as a result, the fluorine content of 10 samples selected at random was from 4.9 to 5.4% (average: 5.2%), revealing that the surface was homogeneously fluorinated. The results obtained are shown in Table 1.

EXAMPLE 19
Fluorination of Silicon Dioxide Particulate 320 g of silicon dioxide particulate (average primary particle size: 0.032 μm, specific surface area: 85 m$^2$/g) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 5 hours. After the reaction, the pressure was reduced to remove the gas. Thereafter, the fluorine-containing gas was filled and the fluorination treatment was performed under the above-described conditions. This operation was repeated to perform the fluorination treatment 5 times in total. The fluorinated silicon dioxide particulate had a specific surface area of 83 m$^2$/g, thus maintained the high specific surface area. The fluorine content on the surface of silicon dioxide particulate was quantitated by XPS, as a result, the fluorine content of 10 samples selected at random was from 5.2 to 5.6% (average: 5.4%), revealing that the surface was homogeneously fluorinated. The results obtained are shown in Table 1.

EXAMPLE 20
Fluorination of Silicon Dioxide Particulate 320 g of silicon dioxide particulate (average primary particle size: 0.080 μm, specific surface area: 56 m$^2$/g) was filled in a 40 L-volume tumbler drier and pre-treated by calcination at 180° C. under reduced pressure for 1 hour. While keeping the temperature at 180° C., a gas (fluorine gas content: 10 vol %) obtained by diluting fluorine gas with nitrogen gas was filled under atmospheric pressure and while rotating the drier at 26 rpm, the surface fluorination treatment was performed for 5 hours. After the reaction, the pressure was reduced to remove the gas. Thereafter, the fluorine-containing gas was filled and the fluorination treatment was performed under the above-described conditions. This operation was repeated to perform the fluorination treatment 5 times in total. The fluorinated silicon dioxide particulate had a specific surface area of 53 m$^2$/g, thus maintained the high specific surface area. The fluorine content on the surface of silicon dioxide particulate was quantitated by XPS, as a result, the fluorine content of 10 samples selected at random was from 5.4 to 5.9% (average: 5.7%), revealing that the surface was homogeneously fluorinated. The results obtained are shown in Table 1.

Comparative Example 1
Fluorination of Titanium Dioxide Particulate 200 g of titanium dioxide particulate (average primary particle size: 0.210 μm, specific surface area: 8 m$^2$/g) was filled in an atmospheric vapor phase flow-type reactor and pre-treated by calcination at 180° C. under reduced pressure for 1 hour. After cooling the system to 150° C. under atmospheric pressure, a gas (fluorine gas content: 10 vol %) obtained by diluting fluorine gas with nitrogen gas was fed into the reactor for 30 minutes to perform the surface fluorination treatment. The surface-fluorinated titanium dioxide particulate had a specific surface area of 7.6 m$^2$/g, thus maintained the high specific surface area. The fluorine content on the surface of titanium dioxide particulate was quantitated by XPS, as a result, the fluorine content of 10 samples selected at random was from 4.0 to 9.5% (average: 9.0%), revealing scattering in the fluorine content. The results obtained are shown in Table 1.

Comparative Example 2
Fluorination of Silicon Dioxide Particulate 200 g of silicon dioxide particulate (average primary particle size: 0.020 μm, specific surface area: 120 m$^2$/g) was filled in an atmospheric vapor phase flow-type reactor and pre-treated by calcination at 180° C. under reduced pressure for 1 hour. While keeping the temperature at 180° C., a gas (fluorine gas content: 10 vol %) obtained by diluting fluorine gas with nitrogen gas was fed into the reactor for 1.5 hours to perform the surface fluorination treatment. The surface-fluorinated silicon dioxide particulate had a specific surface area of 116 m$^2$/g, thus maintained the high specific surface area. The fluorine content on the surface of silicon dioxide particulate was quantitated by XPS, as a result, the fluorine content of 10 samples selected at random was from 1.0 to 2.8% (average: 2.5%), revealing scattering in the fluorine content. The results obtained are shown in Table 1.

TABLE 1

| Example | Metal Oxide | F$_2$ Concentration, % | Temperature, ° C. | Reaction Time, hr | Particle Size, nm | Specific Surface Area, m$^2$/g | Fluorine Content (%) Average | Fluorine Content (%) Range |
|---|---|---|---|---|---|---|---|---|
| 1 | TiO$_2$ | 10 | room temperature | 0.5 | 22 | 55 | 3.0 | 2.9–3.1 |
| 2 | TiO$_2$ | 10 | 100 | 0.5 | 22 | 53 | 3.5 | 3.4–3.6 |
| 3 | TiO$_2$ | 10 | 150 | 0.5 | 22 | 54 | 3.9 | 3.8–4.0 |
| 4 | TiO$_2$ | 10 | 180 | 1.5 | 22 | 52 | 4.8 | 4.6–4.9 |
| 5 | TiO$_2$ | 10 | 180 | 4.5 | 22 | 53 | 11.7 | 11.5–11.9 |
| 6 | TiO$_2$ | 10 | 180 | 7.5 | 22 | 53 | 19.8 | 19.6–19.9 |
| 7 | TiO$_2$ | 10 | 150 | 4.5 | 210 | 7.6 | 11.5 | 11.3–11.7 |
| 8 | TiO$_2$ | 10 | 150 | 7.5 | 210 | 7.6 | 19.5 | 19.3–19.7 |
| 9 | TiO$_2$ | 20 | 150 | 0.5 | 210 | 7.8 | 9.1 | 9.0–9.2 |
| 10 | Al$_2$O$_3$ | 10 | room temperature | 0.5 | 20 | 98 | 7.1 | 6.9–7.3 |
| 11 | Al$_2$O$_3$ | 10 | 100 | 0.5 | 20 | 98 | 8.7 | 8.5–8.9 |
| 12 | Al$_2$O$_3$ | 10 | 150 | 0.5 | 20 | 96 | 10.7 | 10.5–10.9 |
| 13 | Al$_2$O$_3$ | 20 | room temperature | 0.5 | 20 | 95 | 6.4 | 5.9–6.9 |
| 14 | SiO$_2$ | 10 | 180 | 5 | 20 | 116 | 2.5 | 2.4–2.7 |
| 15 | SiO$_2$ | 10 | 180 | 15 | 20 | 117 | 3.9 | 3.8–4.0 |
| 16 | SiO$_2$ | 10 | 180 | 25 | 20 | 118 | 5.1 | 4.8–5.4 |
| 17 | SiO$_2$ | 10 | 180 | 15 | 20 | 115 | 4.1 | 3.8–4.4 |
| 18 | SiO$_2$ | 10 | 180 | 25 | 20 | 113 | 5.2 | 4.9–5.4 |
| 19 | SiO$_2$ | 10 | 180 | 25 | 32 | 83 | 5.4 | 5.2–5.6 |
| 20 | SiO$_2$ | 10 | 180 | 25 | 80 | 53 | 5.7 | 5.4–5.9 |
| Comparative Example 1 | TiO$_2$ | 10 | 150 | 0.5 | 210 | 7.6 | 9.0 | 4.0–9.5 |
| Comparative Example 2 | SiO$_2$ | 10 | 180 | 1.5 | 20 | 116 | 2.5 | 1.0–2.8 |

TEST EXAMPLE
Photochemical Reaction Catalysis of Various Titanium Dioxide Particulates Taking notice of the fact that titanium oxide has a high photochemical reactivity, the surface-fluorinated titanium dioxide particulates prepared in Examples 7 to 9 and Comparative Example 1 were used as a catalyst and determined on their photochemical reactivity from the liquid phase oxidation reaction of tetralin.

More specifically, by referring to the study of Kato et al (see, *Kogyo Kagaku Zasshi* (*Journal of Industrial Chemistry*), 63, 5, 748–750 (1960)), the construction schematically shown in FIG. 1 was used, in which 20 ml of tetralin and 0.02 g of titanium dioxide were charged into a heat-resisting glass-made reactor (5) having a volume of about 100 ml and being connected to a glass tube. The reactor was placed in a constant temperature bath (2) and while stirring by a stirrer (3) in an $O_2$ atmosphere at a reaction temperature of 40.1° C., an ultraviolet ray was irradiated from an ultraviolet lamp (1). The pressure was read at predetermined intervals by a differential pressure gauge (4). The pressure values measured were plotted with respect to the time and the gradient thereof (pressure change: $mmH_2O/min$) was defined as the oxygen absorption rate.

The results obtained are shown in Table 2 together with the results for the system of tetralin not using titanium dioxide and the system of using titanium dioxide particulate not subjected to surface fluorination treatment.

TABLE 2

| | Photocatalytic Activity, mm $H_2O$/min |
|---|---|
| Example 7 | 5.9 |
| Example 8 | 4.8 |
| Example 9 | 6.6 |
| Comparative Example 1 | 6.9 |
| Untreated $TiO_2$ | 8.7 |
| Tetralin alone | 7.0 |

It is seen from Table 2 that there is a correlation between the fluorine content on the surface of titanium dioxide particulate and the inhibition effect of the photochemical catalysis of titanium dioxide (Examples 7 to 9). Thus, the photochemical catalysis can be controlled by adjusting the fluorination reaction time.

USE EXAMPLE
Manufacture of Surface-Fluorinated Titanium Dioxide Particulate for Blending in Thermoplastic Resin Composition Into a tumbler drier, 100 g of titanium dioxide particulate (specific surface area: 8 $m^2/g$, particle size: 0.21 μm) was filled and pre-treated by calcination at 200° C. under reduced pressure for 1 hour. After cooling the system to 20° C., a gas obtained by diluting fluorine gas with nitrogen gas was fed into the reaction for 15 minutes to perform the surface fluorination treatment. The surface-fluorinated titanium dioxide particulate had a specific surface area of 8 $m^2/g$, thus maintained the high specific surface area. The fluorine content on the surface of titanium dioxide particulate was quantitated by XPS, as a result, the fluorine content was 10%.

USE EXAMPLE 1

2 kg of homogeneously fluorinated titanium dioxide particulate obtained by surface-fluorinating titanium dioxide particulate (specific surface area: 8 $m^2/g$, primary particle size: 0.21 μm) under the same reaction conditions as in Example 7 and 100 g of zinc stearate were mixed in a Henschel mixer to obtain a powder pigment of this fluorinated titanium dioxide particulate. Thereafter, 1 kg of the powder pigment and 1 kg of low-density polyethylene (J-lex LDL133K, produced by Nippon Polyolefin K.K.) were mixed and formed using a twin screw kneading extruder into pellets having a diameter of about 3 mm and a length of about 3 mm, thereby obtaining a masterbatch.

The water content of the masterbatch was determined by the above-described method and found to be 200 ppm.

This masterbatch was kneaded with the low-density polyethylene (J-lex LDL133K) not containing the pigment at a mixing ratio of 1:0.667 in LABPLAST MILL (20φ extruder, manufactured by Toyo Seiki K.K.) at 150° C. for 30 minutes to prepare a resin composition. The composition obtained had a water content of 125 ppm. Using this resin composition, a 20 μm-thick film layer was formed on one surface of a 200 μm-thick wood free paper by the high-temperature melt lamination method. The surface state of the thin film formed was visually observed and evaluated on the degree of smoothness, bubbling and microgrit by 4 ranks based on the following criteria A to D, as a result, the rating was as good as rank A.

A: Bubbling and microgrit were scarcely observed.
B: Bubbling was scarcely observed but microgrit was slightly observed.
C: Bubbling and microgrit both were observed.
D: Bubbling and microgrit both were very heavily observed.

USE EXAMPLE 2

2 kg of homogeneously fluorinated titanium dioxide particulate obtained by surface-fluorinating titanium dioxide particulate (specific surface area: 8 $m^2/g$, primary particle size: 0.21 μm) under the same reaction conditions as in Example 8 and 100 g of zinc stearate were mixed in a Henschel mixer. Subsequently, 1 kg of a powder pigment of this fluorinated titanium dioxide particulate and 2 kg of polyimide were mixed and formed using a twin screw kneading extruder into pellets having a diameter of about 3 mm and a length of about 3 mm, thereby obtaining a masterbatch. The water content of the masterbatch was determined by the above-described method and found to be 130 ppm.

This masterbatch was kneaded with the polyimide not containing the pigment at a mixing ratio of 1:0.67 in LABPLAST MILL (20φ extruder, manufactured by Toyo Seiki K.K.) at 250° C. for 30 minutes to prepare a resin composition. The composition obtained had a water content of 95 ppm.

Using this resin composition, a 20 μm-thick film layer was formed on one surface of a 200 μm-thick wood free paper by the high-temperature melt lamination method. The surface state of the thin film formed was visually observed and evaluated on the degree of smoothness and the presence or absence of bubbling and microgrit by 4 ranks A, B, C and D in the same manner as in Use Example 1, as a result, the rating was as good as rank A.

Comparative Use Example 1

1 kg of surface-fluorinated titanium dioxide particulate obtained by surface-fluorinating titanium dioxide particulate (specific surface area: 8 m²/g, primary particle size: 0.21 μm) under the same reaction conditions as in Comparative Example 1 and 1 kg of low-density polyethylene were mixed and formed using a twin screw kneading extruder into pellets having a diameter of about 3 mm and a length of about 3 mm, thereby obtaining a masterbatch.

The water content of the masterbatch was determined by the above-described method and found to be 950 ppm.

This masterbatch was kneaded with the low-density polyethylene not containing the pigment at a mixing ratio of 1:0.67 in LABPLAST MILL (20φ extruder, manufactured by Toyo Seiki K.K.) at 150° C. for 30 minutes to prepare a resin composition. The composition obtained had a water content of 750 ppm.

Using this resin composition, a 20 μm-thick film layer was formed on one surface of a 200 μm-thick wood free paper by the high-temperature melt lamination method. The surface state of the thin film formed was visually observed and evaluated on the degree of smoothness and the presence or absence of bubbling and microgrit by 4 ranks in the same manner as in Use Example 1, as a result, the rating was rank A but the surface smoothness was inferior and the bubbling or microgrit was more generated as compared with those of Examples.

INDUSTRIAL APPLICABILITY

According to the process of the present invention, the surface of metal oxide particulates can be homogeneously fluorinated at any ratio in a very simple and efficient manner. The homogeneously surface-fluorinated metal oxide particulates according to the present invention are useful as an additive for a water repellent/weatherproof coating material, a water repellent/weatherproof resin or a cosmetic material. Furthermore, the homogeneously surface-fluorinated titanium oxide particulates are advantageous in that there is not scattering in the physical properties such as light fastness stability, water repellency and dispersibility. Even when the titanium oxide particulate is incorporated as a white pigment into a thermoplastic resin in a high concentration, the resin coated substrate can maintain the surface smoothness without causing any partial defect and troubles can be greatly prevented from occurring at the melt extrusion coating for obtaining the resin coated substrate.

What is claimed is:

1. A process for manufacturing homogeneously surface-fluorinated metal oxide particulates, comprising surface reacting a fluorine gas with a metal oxide particulate while allowing the metal oxide particulate to flow.

2. The process for manufacturing homogeneously surface-fluorinated metal oxide particulates as claimed in claim 1, wherein a fluorine-containing gas obtained by diluting fluorine is used.

3. The process for manufacturing homogeneously surface-fluorinated metal oxide particulates as claimed in claim 2, wherein the diluting gas is a nitrogen or argon gas.

4. The manufacturing process as claimed in any one of claims 1 to 3, wherein the reaction time and/or the concentration of the raw material fluorine gas and/or the reaction temperature are controlled to obtain a homogeneously surface-fluorinated metal oxide particulate having a controlled surface fluorination ratio.

5. The process for manufacturing homogeneously surface-fluorinated metal oxide particulates as claimed in any one of claims 1–3, wherein the metal oxide is titanium oxide.

6. The process for manufacturing homogeneously surface-fluorinated metal oxide particulates as claimed in any one of claims 1–4, wherein the metal oxide is aluminum oxide.

7. The process for manufacturing homogeneously surface-fluorinated metal oxide particulates as claimed in any one of claims 1–3, wherein the metal oxide is silicon oxide.

8. Homogeneously surface-fluorinated metal oxide particulates.

9. The homogeneously surface-fluorinated metal oxide particulates as claimed in claim 8, which are obtained by the method described in any one of claims 1–3.

10. The homogeneously surface-fluorinated metal oxide particulates as claimed in claim 8, wherein the metal oxide is aluminum oxide.

11. The homogeneously surface-fluorinated metal oxide particulates as claimed in claim 8, wherein the metal oxide is silicon oxide.

12. The homogeneously surface-flunorinated metal oxide particulates as claimed in claim 8, wherein the metal oxide is titanium oxide.

13. A thermoplastic resin composition containing a homogeneously surface-fluorinated titanium oxide particulate, which is a titanium dioxide-containing thermoplastic resin composition for covering a substrate, wherein the homogeneously surface-fluorinated titanium oxide particulate described in claim 12 above is used as the titanium oxide and the water content obtained by dividing the water amount (g) measured by means of a Karl Fischer's moisture meter after 3 g of the composition is allowed to stand in an atmosphere of 60° C. and a relative humidity of 60% for 4 hours to condition the humidity, exposed in a dry air stream having an absolute humidity of 0.009 kgH$_2$O/kg at 80° C. for 4 hours and evacuated at 300° C. for 30 minutes, by the amount (g) of surface-fluorinated titanium dioxide contained in the composition is from 10 to 1,400 ppm.

14. The thermoplastic resin composition containing surface-fluorinated titanium oxide particulate as claimed in claim 13, which contains from 20 to 80 wt % of the homogeneously surface-fluorinated titanium oxide particulate.

15. The thermoplastic resin composition containing homogeneously surface-fluorinated titanium oxide particulate as claimed in claim 13 or 14, which is obtained by fluorinating titanium dioxide containing from 0.001 to 0.2 parts by weight of aluminum oxide, silicon oxide and/or zirconium oxide per 100 parts by weight of the titanium dioxide to have a fluorine content of from 0.001 to 61 wt % on the surface thereof and then kneading it with a thermoplastic resin.

16. A masterbatch for a thermoplastic resin composition containing a homogeneously surface-fluorinated titanium oxide particulate, which is a masterbatch for a thermoplastic resin composition containing titanium dioxide in a high concentration for covering a substrate, wherein the homogeneously surface-fluorinated titanium oxide particulate described in claim 12 is used as the titanium dioxide and the water content obtained by dividing the water amount (g) measured by means of a Karl Fischer's moisture meter after 3 g of the composition is allowed to stand in an atmosphere of 60° C. and a relative humidity of 60% for 4 hours to condition the humidity, exposed in a dry air stream having an absolute humidity of 0.009 $kgH_2O/kg$ at 80° C. for 4 hours and deaerated at 300° C. for 30 minutes, by the amount (g) of surface-fluorinated titanium dioxide contained in the composition is from 10 to 1,400 ppm.

17. The masterbatch for a thermoplastic resin composition containing a homogeneously surface-fluorinated titanium oxide particulate as claimed in claim 16, which contains from 30 to 80 wt % of the homogeneously surface-fluorinated titanium dioxide particulate.

18. The masterbatch for a thermoplastic resin composition containing a homogeneously surface-fluorinated titanium oxide particulate as claimed in claim 16 or 17, which is obtained by fluorinating titanium dioxide containing from 0.001 to 0.2 parts by weight of aluminum oxide, silicon oxide and/or zirconium oxide per 100 parts by weight of the titanium dioxide to have a fluorine content of from 0.001 to 61 wt % on the surface thereof, and kneading and extrusion-molding it with a thermoplastic resin.

19. The process for manufacturing homogeneously surface-fluorinated metal oxide particulates as claimed in claim 1, wherein the reaction temperature is from 0° C. to 200° C.

20. The process for manufacturing homogeneously surface-fluorinated metal oxide particulates as claimed in claim 1, wherein the reaction temperature is from 20° C. to 190° C.

* * * * *